United States Patent [19]

Noso et al.

[11] Patent Number: 4,538,295
[45] Date of Patent: Aug. 27, 1985

[54] SPEECH RECOGNITION SYSTEM FOR AN AUTOMOTIVE VEHICLE

[75] Inventors: Kazunori Noso, Yokosuka; Norimasa Kishi, Yokohama, both of Japan

[73] Assignee: Nissan Motor Company, Limited, Japan

[21] Appl. No.: 408,699

[22] Filed: Aug. 16, 1982

[51] Int. Cl.³ .............................................. G10L 1/00
[52] U.S. Cl. ......................................... 381/43; 381/47
[58] Field of Search .................. 381/46, 47, 71, 86; 455/297, 312

[56] References Cited

U.S. PATENT DOCUMENTS

| 4,061,874 | 12/1977 | Fricke et al. | 381/86 |
| 4,087,630 | 5/1978 | Browning et al. | 381/51 |
| 4,100,370 | 7/1978 | Suzuki et al. | 381/51 |
| 4,158,750 | 6/1979 | Sakoe et al. | 381/51 |
| 4,409,435 | 10/1983 | Ono | 381/71 |
| 4,461,024 | 7/1984 | Renager et al. | 381/46 |

FOREIGN PATENT DOCUMENTS 916781 1/1963 United Kingdom .

OTHER PUBLICATIONS

D. Raj Reddy, "Speech Recognition by Machine: A Review" Proceedings of the IEEE, vol. 64, No. 4, Apr. 1976.

IBM Technical Disclosure Bulletin, vol. 22, No. 11, Apr. 1980, S. L. Dunik, "Phoneme Recognizer Using Formant Ratios".

*Primary Examiner*—E. S. Matt Kemeny
*Attorney, Agent, or Firm*—Lowe, King, Price & Becker

[57] ABSTRACT

A speech recognition system for an automotive vehicle can effectively eliminate noise generated by vehicle engines, and comprises a group of bandpass filters the pass bands of which are approximately from 500 to 600, from 900 to 1200, and from 900 to 2200 Hz, for effectively passing only the speech sound formant frequencies while eliminating the major frequency components of engine noise less than 500 Hz, in addition to the conventional speech recognizer. Further, it is desirable to provide the speech recognition system with a high-frequency compensator for enhancing the voltage level of the high frequency components of the electrical signal representing spoken instructions at a rate of 20 dB or more per decade increase in frequency and/or a plurality of notch filters fo sharply reducing the major engine noise frequency components at 200, 400, and 800 Hz.

12 Claims, 13 Drawing Figures

SPEECH RECOGNITION SYSTEM FOR AN AUTOMOTIVE VEHICLE

BACKGROUND OF THE INVENTION

1. Field of the Invention

The present invention relates generally to a speech recognition system for an automotive vehicle, and more particularly to a speech recognition system provided with means for effectively eliminating noise generated by engines from a spoken phrase signal inputted through a microphone.

2. Description of the Prior Art

There is a well-known speech recognizer which can activate various actuators in response to human spoken instructions. When this speech recognizer is mounted on a vehicle, the headlight, for instance, can be turned on or off in response to spoken instructions such as "Headlight on" or "Headlight off". Such a speech recognizer usually can recognize various spoken instructions in order to control various actuators; however, there are some problems involved in applying this system to an automotive vehicle.

A speech recognizer is usually used in a relatively quiet environment; however, the speech recognition system for an automotive vehicle is typically used in a relatively noisy environment, especially while an engine is running. The speech recognition rate (the percentage of correct recognition of spoken phrase instruction) of the conventional speech recognizer is high in the case where background noise level is low, but low in the case where background noise level is high.

Therefore, when noise generated by an engine exceeds a predetermined level within the passenger compartment, the conventional speech recognizer may not activate the actuator corresponding to a spoken instruction inputted thereto or may activate a different actuator, resulting in an undesirable or even in a dangerous situation.

A more detailed description of a typical speech recognizer will be made with reference to the attached drawing in conjunction with the present invention under DETAILED DESCRIPTION OF THE PREFERRED EMBODIMENTS.

SUMMARY OF THE INVENTION

With these problems in mind therefore, it is the primary object of the present invention to provide a speech recognition system for an automotive vehicle which can effectively eliminate noise, in particular noise generated by vehicle engines, from the electrical signals representing spoken instructions inputted thereto through a microphone.

To achieve the above-mentioned objects, the speech recognition system for an automotive vehicle according to the present invention comprises a group of bandpass filters which filter frequency components of less than 500 Hz from received electrical signals, in addition to a high-frequency compensator for enhancing the voltage level of the higher frequency components of the electric signal representing both noise and spoken instructions at a rate of 20 dB or more per decade of increase in frequency and/or a plurality of notch filters for sharply reducing the major frequency components (200, 400, and 800 Hz) of vehicle engine noise.

Furthermore, when the bandpass filters are so designed as to pass only the formant frequency ranges (explained later) of speech sounds (500 to 600, 900 to 2200 Hz), it is possible more effectively to eliminate noise generated by vehicle engines from the electrical signal representing spoken instructions inputted to the system through a microphone.

BRIEF DESCRIPTION OF THE DRAWINGS

The features and advantages of the speech recognition system for an automotive vehicle according to the present invention over the prior-art speech recognizer will be more clearly appeciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding of the present invention, a brief reference will be made to the principle or operation of a typical prior-art speech recognizer, with reference to FIGS. 1 and 2.

Figure 1:
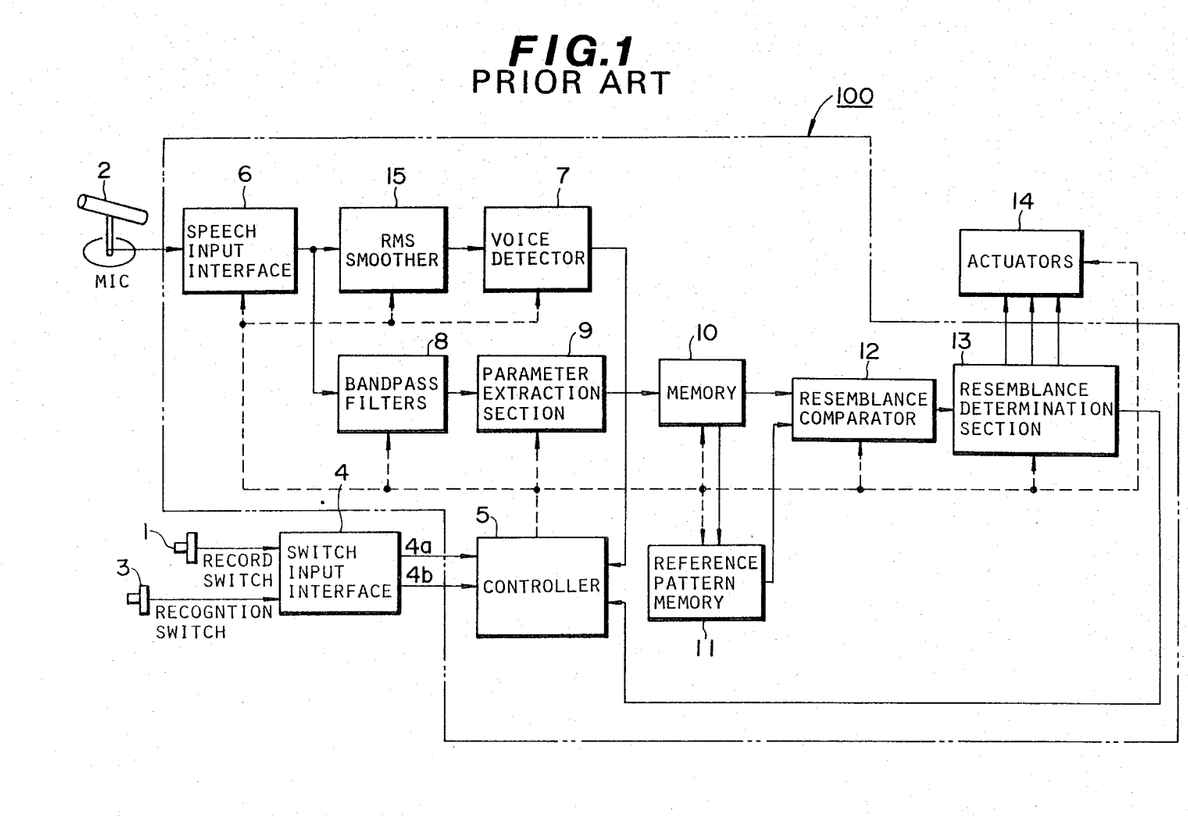
FIG. 1 is a schematic block diagram of a typical prior-art speech recognizer for assistance in explaining the operations thereof.

FIG. 1 is a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 1 and outputs a signal to a controller 5 via a wire 4a. In response to this signal, the controller 5 outputs a recording mode command signal to other sections in order to preset the entire speech recognizer to the recording mode. In the spoken instruction recording mode, when the user says a phrase to be used as a spoken instruction, such as "open doors", near a microphone 2, the spoken phase is transduced into a corresponding electrical signal through the microphone 2, amplified through a speech input interface 6, smoothed through a root-mean-square (RMS) smoother 15, and finally inputted to a voice detector 7. This voice detector 7 detects whether or not the magnitude of the spoken phase signal exceeds a predetermined level for a predetermined period of time (150 to 250 ms) in order to determine the start of the spoken phrase input signal and whether or not the magnitude of the signal drops below a predetermined level for a predetermined period of time in order to determine the end of the signal. Upon detection of the start of the signal, this voice detector 7 outputs another recording mode command signal to the controller 5. In response to this command signal, the controller 5 activates a group of bandpass filters 8, so that the spoken phrase signal from the microphone 2 is divided into a number of predetermined frequency bands. Given to a parameter extraction section 9, the frequency-divided spoken phrase signals are squared or rectified therein in order to obtain the voice power spectrum for each of the frequency bands and then converted into a time-slice of digital time-series matrix-phonetic pattern data (explained later). These data are next stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for use in recognizing the speech instructions.

After having recorded the reference spoken instructions, the user can input speech instructions, such as "open doors", to the speech recognizer through the microphone 2 while depressing a recognition switch 3.

When this recognition switch 3 is depressed, the switch input interface 4 detects the depression of the recognition switch 3 and outputs a signal to the controller 5 via a wire 4b. In response to this signal, the controller 5 outputs a recognition mode command signal to other sections in order to preset the entire speech recognizer to the recognition mode. In this spoken phrase recognition mode, when the user says an instruction phrase similar to the one recorded previously near the microphone 2 and when the voice detector 7 outputs a start signal, the spoken instruction is tranduced into a corresponding electric signal through the microphone 2, amplified through the speech input interface 6, filtered and divided into voice power spectra through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the correlation factor of the inputted speech instruction to the reference speech instruction after time normalization and level normalization for compensating for variable speaking rate (because a person may speak quickly and loudly at one time but slowly and at a whisper at some other time). The correlation factor is usually obtained by calculating Tchebycheff distance (explained later) between recognition-mode time-series matrix-phonetic pattern data and recording-mode time-series matrix-phonetic pattern data. The correlation factor calculated by the resemblance comparator 12 is next given to a resemblance determination section 13 to determine whether or not the calculated values lie within a predetermined range, that is, to evaluate their cross-correlation. If within the range, a command signal, indicating that the recognition-mode spoken instruction has an adequate resemblance to one of the recorded instruction phrases, is outputted to one of actuators 14, for instance, in order to open the vehicle doors. The above-mentioned operations are all executed in accordance with command signals outputted from the controller 5.

This speech recognizer 100 can be seen to be made up functionally of an input section (microphone 2, interface 6), a voice detection section (smoother 15, detector 7), and a voice analysis section (all other components). The invention concerns the input section predominantly.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 can all be incorporated within the microcomputer, executing the same or similar processing, calculation or operations as explained hereinabove.

Additionally, the digital time-series matrix-phonetic pattern data and the Tchebycheff distance are defined as follows:

In the case where the number of the bandpass filters is four and the number of time-slices for each is 32, the digital recording-mode time-series matrix-phonetic pattern data can be expressed as $$F(A) = f(i,j) = \begin{vmatrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{vmatrix}$$

where A designates a first recording-mode speech instruction (reference) (e.g. OPEN DOORS), i denotes the filter index, and j denotes time-series data index.

Here, if a first recognition-mode speech instruction (e.g. OPEN DOORS) is designated by B, the Tchebycheff distance can be obtained from the following expression:

$$l = |F(A) - F(B)| = \sum_{i=1}^{4} \sum_{j=1}^{32} |f^A(i,j) - f^B(i,j)|$$

Figure 2:
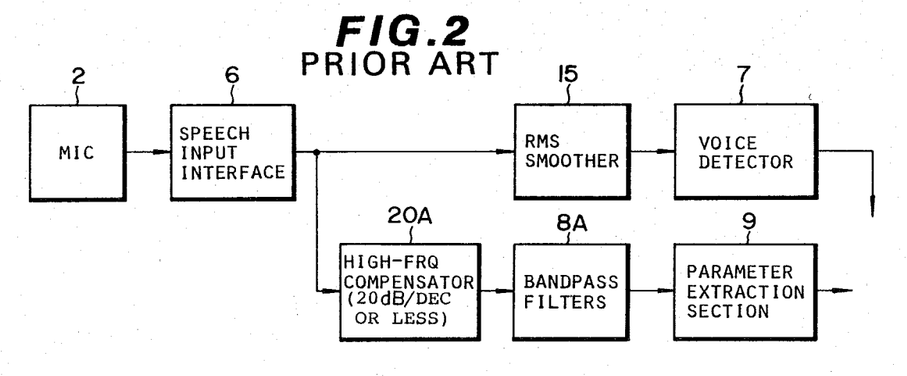
FIG. 2 is a schematic block diagram of an essential portion of the typical prior-art speech recognizer including a high-frequency compensator having a gradient of 20 dB/decade or less.

In addition, the typical prior-art speech recognizer 100 usually includes a high-frequency compensator 20A between the speech input interface 6 and the bandpass filters 8A, as shown in FIG. 2, in order to enhance the higher frequency range of speech sounds. The reason is as follows: since speech sounds tend to be attenuated at the higher frequencies, when the speech sounds are amplified at a constant amplification degree throughout the entire frequency range thereof, the resolution of the sound volume level in the higher frequency band will be much poorer than at lower frequencies. Therefore, frequency-gain characteristics with a gradient of 20 dB/decade or less are commonly effected in the high-frequency compensator 20A in the prior-art speech recognizer, where "decade" means a multiplicative factor of 10 or decimal order of magnitude of increase in frequency.

This gradient value is sufficient in usual, quiet environments, but insufficient in noisy environments. In particular, in a speech recognition system for an automotive vehicle, a gradient of 20 dB/decade or less is not sufficient, because noise generated by vehicle engines is additionally superposed upon the background noise. In this case, noise includes components generated by the engine mounted on the user's own vehicle and other engines mounted on other vehicles in the vicinity of the user's vehicle, the major components of which cluster around frequencies of 200, 400 and 800 Hz.

In view of the above description and with reference to the attached drawings, the embodiments of the speech recognition system for an automotive vehicle according to the present invention will be described hereinbelow.

Figure 3:
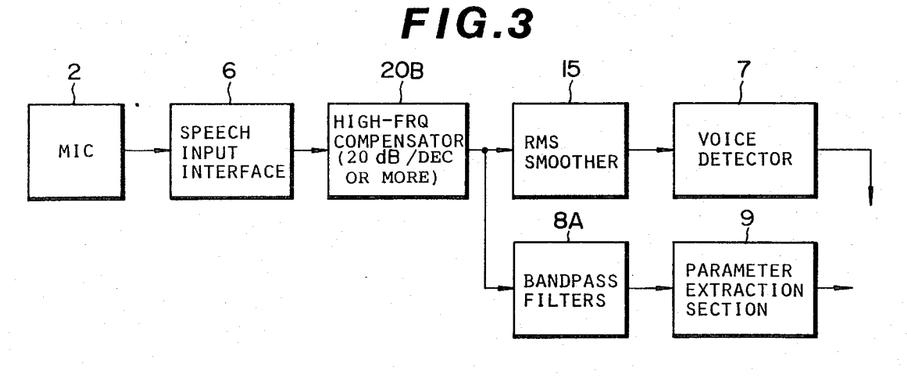
FIG. 3 is a schematic block diagram of an essential portion of a first embodiment of the speech recognition system for an automotive vehicle according to the present invention, which includes a high-frequency compensator having a gradient of 20 dB/decade or more.

FIG. 3 is a schematic block diagram of an essential portion of a first embodiment of the speech recognition system according to the present invention.

In the figure, the reference numeral 20B denotes a high-frequency compensator provided with gain-frequency characteristics having a gradient of 20 dB/decade or more, which can compensate for the low-frequency components of noise generated from vehicle engines. This high-frequency compensator 20B is usually made up of a plurality of differentiating circuits.

The reason why a gradient of 20 dB/decade or more is necessary will be described in more detail with reference to the attached graphical representations.

Figure 4:
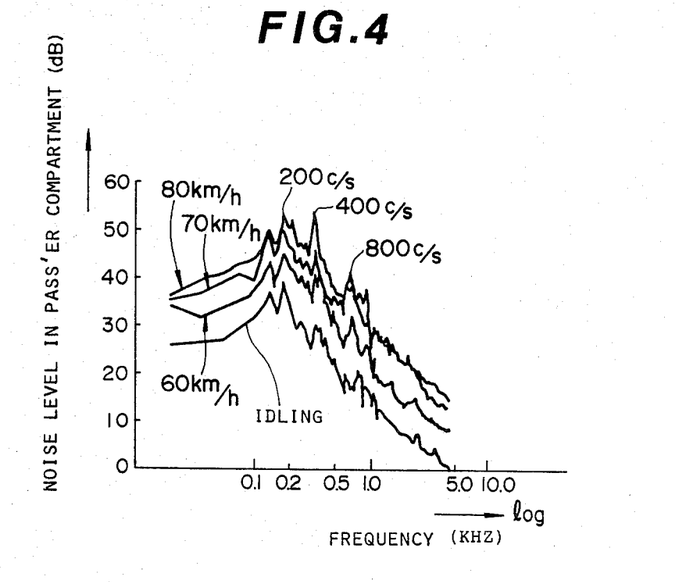
FIG. 4 is a graphical representation of the frequency characteristics of noise within a passenger compartment of an automotive vehicle.

FIG. 4 shows the frequency characteristics of noise within a passenger compartment of an automotive vehicle as measured at four different vehicle speeds—idling, 60, 70 and 80 Km/h. This graphical representation clearly indicates that there are three peaks near frequencies of 200, 400 and 800 Hz.

Figure 5:
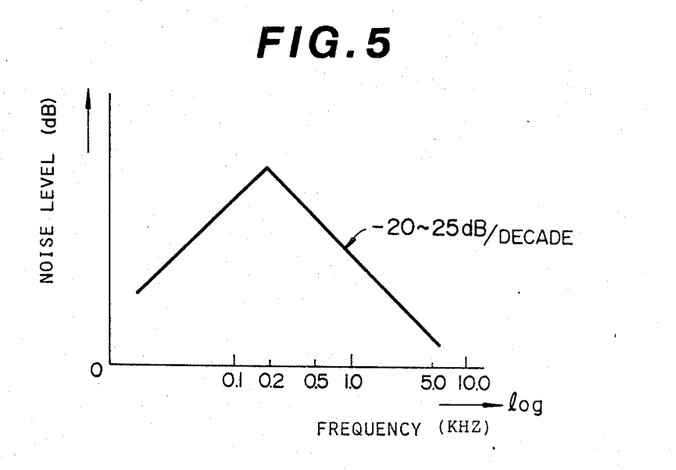
FIG. 5 is a graphical approximation of the frequency characteristics of FIG. 4.

FIG. 5 shows the frequency characteristics of FIG. 4 approximated by a pair of line segments. This graphical representation indicates that the characteristics have a gradient of about minus 20 to 25 dB/decade in the frequency range greater than approximately 200 Hz.

Figure 6:
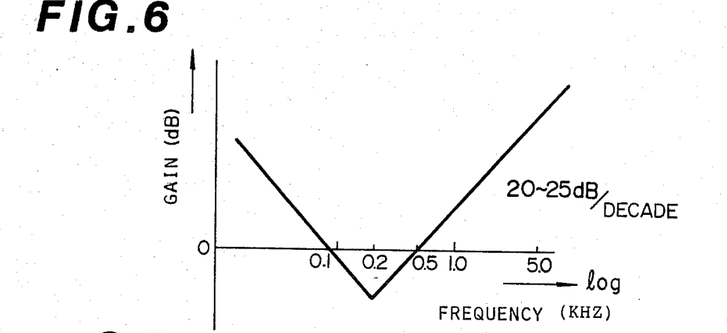
FIG. 6 is a graphical representation of the frequency characteristics of the high-frequency compensator for use in the speech recognition system for an automotive vehicle according to the present invention.
Figure 7:
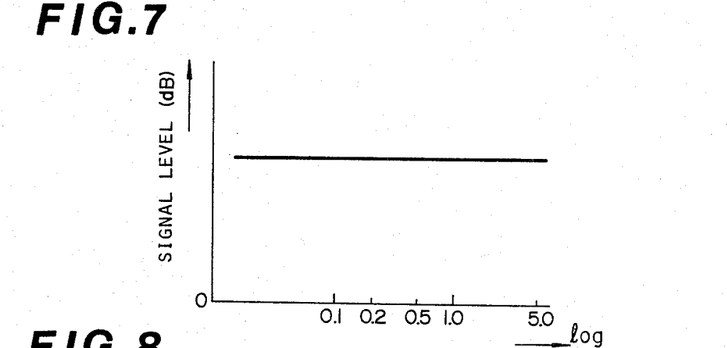
FIG. 7 is a graphical representation showing the cancellation of noise signals by the high-frequency compensator used in the speech recognition system for an automotive vehicle according to the present invention.

FIG. 6 shows the frequency characteristic of the high-frequency compensator 20B according to the present invention, which is the reverse of that in FIG. 5. Accordingly, the high-frequency compensator 20B can cancel the effect of the vehicle engine noise within a passenger compartment, as shown in FIG. 7.

The operation of this embodiment will be described hereinbelow.

A spoken phrase instruction including both speech sounds and engine noise is inputted into the microphone 2, transduced into the corresponding electric signal, amplified by the speech input interface 6, and inputted to the high frequency compensator 20B. Since vehicle engine noise approximates the frequency characteristics shown in FIG. 5 and the compensator 20A has those characteristics shown in FIG. 6, these opposing characteristics result in the flat frequency/amplitude trace of a spoken instruction signal excluding vehicle engine noise shown in FIG. 7. The spoken instruction signal thus obtained is next given to the voice detector 7 via the root-mean-square smoother 15. Since there is a predetermined threshold level in the voice detector 7, when the spoken phrase instruction signal exceeds the threshold level for a predetermined period of time, a signal is outputted to indicate the start of speech instruction signals. Therefore, when the threshold value is preset to be a little higher than the signal level shown in FIG. 7, it is possible for the voice detector 7 to accurately detect the start and end points of a speech instruction while eliminating the misleading noise generated by vehicle engines. In addition, the spoken instruction signal from the high-frequency compensator 20B is applied to the bandpass filters 8 etc. in order to obtain time-series matrix-phonetic pattern data. Furthermore, in this embodiment, since the component of sound pitch included in vowels (the foundamental frequency of which is about 100 Hz) experiences minimal attenuation by the high-frequency compensator 20B, it is possible to reliably detect the sounds of speech.

Figure 8:
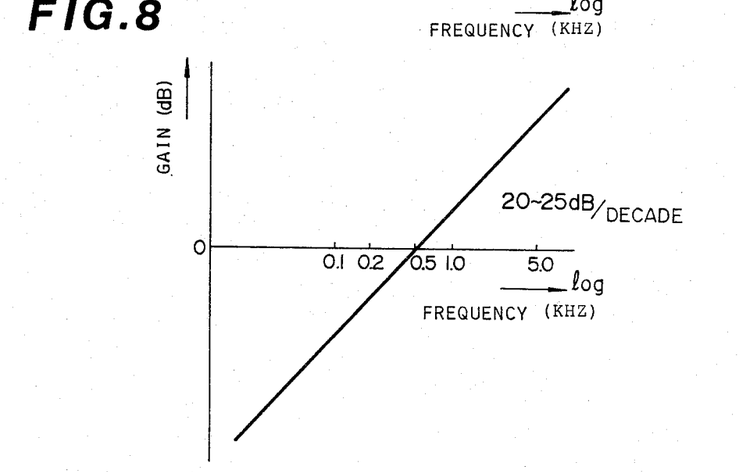
FIG. 8 is a graphical representation of the other frequency characteristics of the high-frequency compensator used in the speech recognition system for an automotive vehicle according to the present invention.

FIG. 8 shows alternative frequency characteristics for the high-frequency compensator 20B according to the present invention, which exhibits a linear characteristic throughout its frequency range so that background noise and compensator gain have opposite characteristics at frequencies greater than 200 Hz but the same characteristics at frequencies less than 200 Hz. The reason why such characteristics can be adopted is as follows: formant frequencies (characteristic components of the sounds of speech or the resonance bands regarded as determining the phonetic quality of a vowel) of speech include a first group of 300 to 500 Hz and a high-order group of more than 1 KHz; therefore, if only the components of these formant frequencies can be given to the voice detector 7 or the parameter extraction section 9, it is possible to accurately recognize spoken instructions. Even if the frequency components of less than 200 Hz are disregarded, there exists no practical disadvantage. Therefore, in the above-mentioned two methods, speech sounds are enhanced at the expense of vehicle engine noise by amplifying only the formant frequencies greater than 200 Hz in order to accurately detect spoken instructions.

Figure 9:
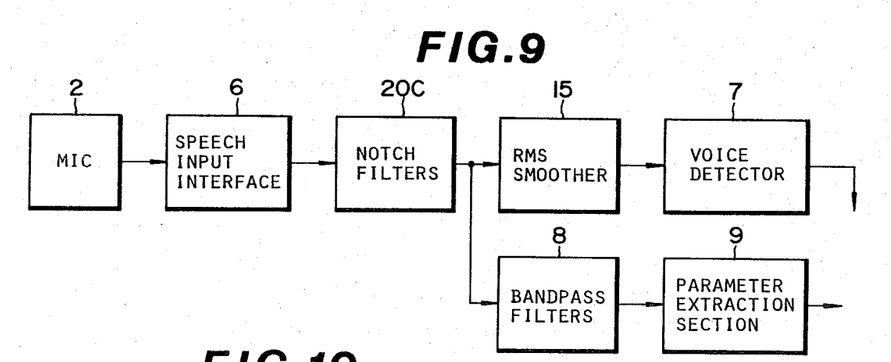
FIG. 9 is a schematic block diagram of an essential portion of a second embodiment of the speech recognition system for an automotive vehicle according to the present invention, which employs notch filters.

FIG. 9 shows a second embodiment of the speech recognition system for an automotive vehicle according to the present invention, which includes notch filters in place of the high-frequency compensator 20B. Although the second embodiment described hereinbelow includes only the notch filters, it is of course possible to use the notch filters in addition to the high-frequency compensator 20B in order to more effectively eliminate the frequency components of noise generated by engines.

As already explained, since the noise generated by an engine consists largely of frequency components at 200, 400 and 800 Hz, it is possible to effectively eliminate vehicle engine noise from the spoken instruction signal by attenuating these frequencies. Notch filters have relatively sharp attenuation characteristics as compared with ordinary bandpass filters; therefore, the vehicle engine noise can be eliminated without attenuating the first spoken sound formant frequency from 300 to 500 Hz and the high-order spoken sound formant frequency of more than 1 KHz.

Figure 10:
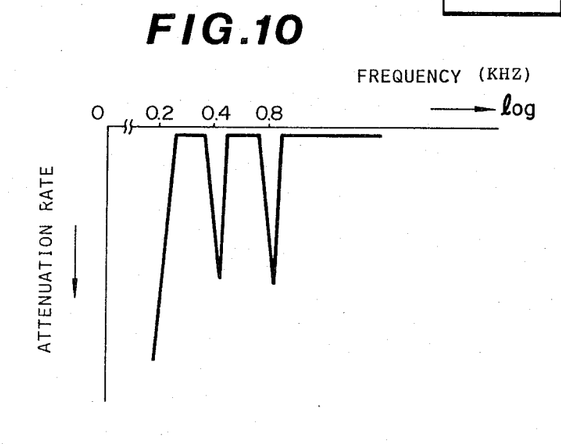
FIG. 10 is a graphical representation of the frequency characteristics of the notch filters shown in FIG. 9.

FIG. 10 shows exemplary frequency characteristics of these notch filters 20C. Alternately, in this embodiment, it would also be effective to use just one notch filter to eliminate the loudest peak at 400 Hz.

Figure 11:
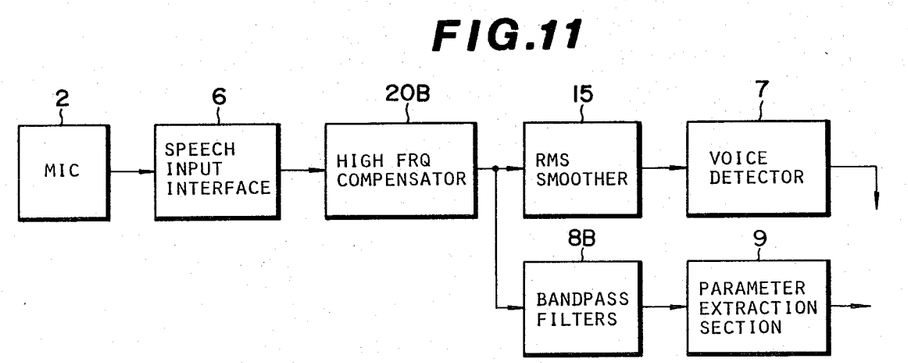
FIG. 11 is a schematic block diagram of an essential portion of a third embodiment of the speech recognition system for an automotive vehicle according to the present invention, which employs the high-frequency compensator having a gradient of 20 dB or more and three bandpass filters.

FIG. 11 shows a third embodiment of the speech recognition system for an automotive vehicle according to the present invention, which includes bandpass filters which can pass only the speech sound formant frequencies of 500 to 600 Hz±10 percent, 900 to 1200 Hz±10 percent and 1200 to 2200 Hz±10 percent.

Figure 12:
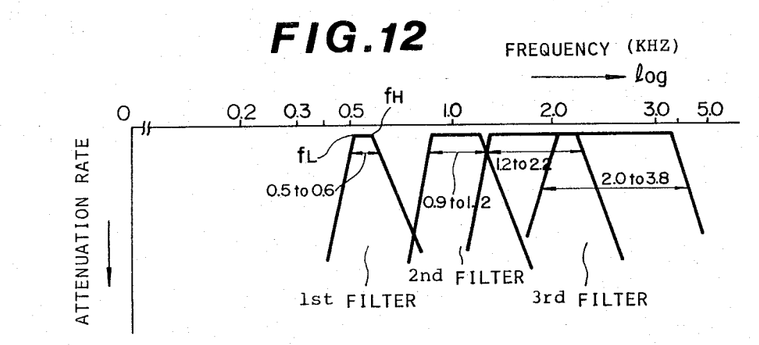
FIG. 12 is a graphical representation of the frequency characteristics of the three bandpass filters shown in FIG. 11.

FIG. 12 shows exemplary frequency characteristics of these bandpass filters 8B.

In this embodiment, as shown in FIG. 12, the frequency components lower than 500 Hz are completely attenuated. Since the frequency components of 200 Hz and 400 Hz are very strong in vehicle engine noise power as depicted in FIG. 4, even if only the components lower than 500 Hz are attenuated, almost all vehicle noise frequency components can be eliminated. However, in this case, since the first spoken sound formant component of 300 Hz is also necessarily attenuated, there arises a different problem in that it may not be possible to sufficiently extract the fundamental components of vowel sounds. However, various experiments have indicated that if the pass bands of the bandpass filters are predetermined to be more than 500 Hz as described above, it is possible to sufficiently extract vowel sounds.

Furthermore, in order to extract the frequency components of silent consonant sounds, it is preferable to additionally provide a bandpass filter having a pass band of about 2000 to 3800 Hz.

Figure 13:
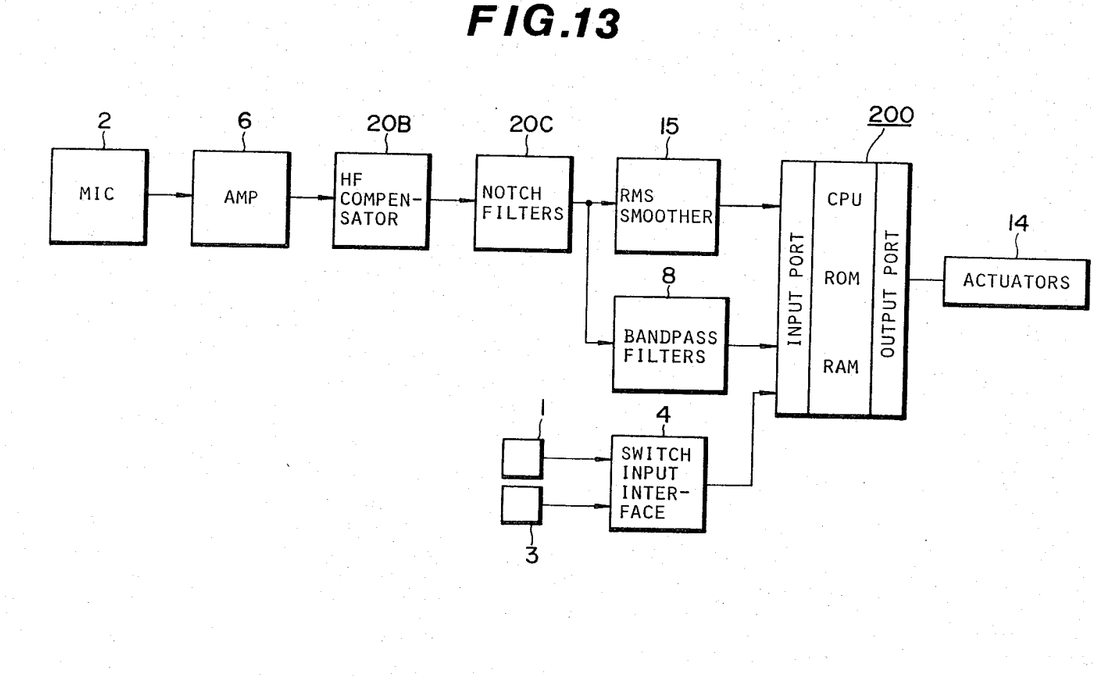
FIG. 13 is a schematic block diagram of a fourth embodiment of the speech recognition system using a microcomputer for an automotive vehicle according to the present invention, which employs a high-frequency compensator having a gradient of 20 dB/decade or more, notch filters for attenuating the major vehicle engine noise frequency components and a group of bandpass filters the lowest central pass band frequency of which is more than 500 Hz.

FIG. 13 shows a fourth embodiment of the speech recognition system using a microcomputer which performs the functions of all of the noise-eliminating means, including a high-frequency compensator having a gain/frequency gradient of 20 dB/decade or more, notch filters for attenuating the major vehicle engine noise frequency components at 200, 400, and 800 Hz, and a group of bandpass filters, the lowest central pass band frequency of which is more than 500 Hz.

In the figure, a microcomputer 200 including a central processing unit, a read-only memory, a random-access memory, etc. performs various processing, calculations, comparisons and operations similar to those performed by the voice detector 7, the parameter extraction section 9, the memory unit 10, the reference pattern memory unit 11, the resemblance comparator 12, the resemblance determination section 13, and the controller 5, which have already been explained hereinabove. Additionally in FIG. 13, the reference numeral 6 denotes an amplifier; however, this amplifier is usually included in the speech input interface 6 of FIG. 1. Furthermore, the root-mean-square smoother 15 is shown in FIG. 13 as a discrete unit; however, it is possible to perform the same function by using the microcomputer 200.

The fourth embodiment includes three noise eliminating means (the compensator, notch filters and bandpass filters) all as described hereinabove; however, the notch filters are not necessarily required because the functions of the notch filters are almost the same as those of the bandpass filters according to the present invention.

As described above, in the speech recognition system for an automotive vehicle according to the present invention, since there is provided a group of bandpass filters the lowest central pass band frequency of which is more than 500 Hz or notch filters for attenuating the major vehicle noise frequency components at 200, 400 and 800 Hz, in addition to a high-frequency compensator having a gradient of 20 to 25 dB/decade or more, it is possible to effectively separate vehicle engine noise from speech instruction signals or extract speech instruction signals from vehicle engine noise. In other words, in the speech recognition system for an automotive vehicle according to the present invention, the speech instructions can be reliably recognized within the noisy passenger compartment and thus the speech instruction recognition rate can be improved markedly.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A speech recognition system for an automotive vehicle for activating vehicle actuators in response to a spoken instruction signal received through a microphone, comprising:
    (a) a voice input section including notch filter means for attenuating frequency components of the signals received through the microphone at approximately 400 Hz;
    (b) voice detection means connected to said notch filter means for detecting beginning and end of spoken instruction signals and outputting instruction start and end signals for identifying, respectively, start and end of an instruction;
    (c) a plurality of bandpass filter means connected to said notch filter means for further filtering signals filtered through said notch filter means to human speech frequency components and to noise frequency components due to noise resulting from engine operation; and (d) voice analysis means connected to said bandpass filter means and responsive to the instruction start and end signals for analyzing the signals filtered through said bandpass filter means, comparing analyzed results with predetermined reference values corresponding to at least one spoken instruction, and for activating at least one actuator when the analyzed results match predetermined reference values associated with the actuator.

2. A speech recognition system for an automotive vehicle as set forth in claim 1, wherein the lowest central passband frequency of said bandpass filter means is above 500 Hz.

3. A speech recognition system for an automotive vehicle as set forth in claim 1, wherein passband frequencies of said bandpass filter means range from 500 to 600 Hz and from 900 to 2200 Hz.

4. A speech recognition system for an automotive vehicle as set forth in claim 1, wherein the passband frequencies of said bandpass filter means range from 500 to 600 Hz and 900 to 3800 Hz.

5. In a speech recognition system for automotive vehicle for activating vehicle actuators in response to spoken instructions received through a microphone, having
(a) a sound input section for filtering signals from a microphone,
(b) a voice detection section connected to said sound input section for detecting the beginning and end of spoken instructions and for outputting instruction start and end signals for identifying, respectively, start and end of an instruction, and
(c) a voice analysis section connected to said input section and responsive to said instruction start and end signals, the improvement comprising: compensating means in said sound input section for compensating for variable frequency characteristic noise signals present in said signals from a microphone, said compensating means including filter means comprised of first means having a frequency response characterized by a high frequency characteristic substantially inverse to a high frequency characteristic of said noise signals for cancelling said noise signals and for providing a substantially flat response at said high frequencies to said noise signals.

6. The speech recognition system as set forth in claim 1, wherein said notch filter means further attentuates frequency components of the signals form the microphone at approximately 200 Hz and at approximately 800 Hz.

7. The speech recognition system as set forth in claim 5, wherein said high-frequency compensating means amplifies frequency components of the signal from the microphone to a degree which increases with frequency at a rate of 20 dB or more per decade.

8. The speech recognition system as set forth in claim 7, wherein said high-frequency compensator amplifies frequency components of the signal from the microphone lower than about 200 Hz to a degree which decreases with frequency, so that the frequency components lower than 200 Hz are attenuated in comparison to other frequencies, at a rate of −20 dB or less per decade.

9. A speech recognition system as set forth in claim 5 wherein said filter means includes second means characterized by a frequency response having a predetermined low frequency characteristic substantially inverse to a low frequency characteristic of said noise signals for cancelling said noise signals and for providing a substantially flat response at said high frequencies and said low frequencies to said noise signals.

10. A speech recognition system as set forth in claim 5 wherein said filter means is characterized by a negative slope low frequency response and by a positive slope high frequency response for providing a substantially flat response to said noise signal at both high and low frequencies.

11. The speech recognition system as set forth in claim 2, wherein said notch filter means further attenuates, frequency components of the signals from the microphone at approximately 200 Hz and at approximately 800 Hz.

12. A speech recognition system for an automotive vehicle as set forth in claim 4, wherein passband frequencies of said bandpass filter means range from 500 to 600 Hz and 900 to 3800 Hz.

* * * * *